United States Patent [19]

Scholsky et al.

[11] Patent Number: 5,010,166

[45] Date of Patent: * Apr. 23, 1991

[54] PROCESS AND APPARATUS FOR PRODUCING POLYOL POLYMERS AND POLYOL POLYMERS SO PRODUCED

[75] Inventors: Kevin M. Scholsky, Citrus Heights, Calif.; Lisa M. Larsen, Little Lake, Mich.; Rodger C. Kruse, Racine, Wis.

[73] Assignee: S. C. Johnson & Son, Inc., Racine, Wis.

[*] Notice: The portion of the term of this patent subsequent to Jun. 12, 2007 has been disclaimed.

[21] Appl. No.: 481,132

[22] Filed: Feb. 16, 1990

Related U.S. Application Data

[63] Continuation-in-part of Ser. No. 356,647, May 19, 1989, Pat. No. 4,933,430, which is a continuation of Ser. No. 22,297, Mar. 5, 1987, abandoned.

[51] Int. Cl.$^5$ .............. C08G 69/14; C08G 63/08; C08G 67/02
[52] U.S. Cl. .................................. 528/323; 528/326; 528/354; 528/259; 528/370; 528/392; 528/393
[58] Field of Search ............... 528/323, 326, 354, 359, 528/370, 392, 393

[56] References Cited

U.S. PATENT DOCUMENTS

| | | | |
|---|---|---|---|
| Re. 27,151 | 6/1971 | Hicks | 260/470 A |
| 3,169,945 | 2/1965 | Hostettler et al. | 260/78.3 |
| 3,284,417 | 11/1966 | Hostettler et al. | 260/78.3 |
| 3,502,623 | 3/1970 | Hurworth et al. | 528/354 |
| 3,598,791 | 8/1971 | Nieuwenhuis et al. | 528/359 |
| 3,655,631 | 4/1972 | Fraser et al. | 528/354 |
| 3,760,034 | 9/1973 | Critchfield | 528/354 |
| 3,892,714 | 7/1975 | Sampson et al. | 528/58 |
| 4,005,155 | 1/1977 | Sampson et al. | 525/162 |
| 4,082,816 | 4/1978 | Fisk et al. | 528/361 |
| 4,175,177 | 11/1979 | Potts | 528/354 |
| 4,412,061 | 10/1983 | Wu | 528/315 |
| 4,414,370 | 11/1983 | Hamielec et al. | 526/209 |
| 4,506,056 | 3/1985 | Gaylord | 525/301 |
| 4,529,787 | 7/1985 | Schmidt et al. | 526/209 |
| 4,546,046 | 10/1985 | Etzell et al. | 525/450 |
| 4,546,160 | 10/1985 | Brand et al. | 526/320 |
| 4,921,934 | 5/1990 | Bixler et al. | 524/504 |
| 4,933,430 | 6/1990 | Kessler et al. | 528/323 |

OTHER PUBLICATIONS

U.S. Ser. No. 311,503 (now abandoned and referred to in U.S. Pat. No. 3,892,714).
ASTM D 2794-84; "Resistance of Organic . . . ", Aug. 31, 1984, pp. 518-520.
ASTM D 3363-74, "Film Hardness by Pencil Test", Oct. 25, 1974, pp. 670-671.
Brode et al.—Lactone Polymerization & Polymer Properties, pp. 1109-1144 (1972).

(List continued on next page.)

Primary Examiner—Charles L. Bowers, Jr.
Assistant Examiner—Patrick A. Doody

[57] ABSTRACT

A process and an apparatus for producing a novel polyol polymer is disclosed. The process comrises combining at an elevated reaction temperature and for a predetermined period of time an (1) addition-polymerizable monomer that is also a free-radical initiator together with an (2) ethylenically-unsaturated monomer that has a nucleophilic or an electrophilic moiety. The elevated temperature is so chosen as to be effective for initiating desired "addition copolymerization" of the addition-polymerizable monomer with the ethylenically-unsaturated monomer. The process further comprises combining with the addition-polymerizable monomers, at a preselected superatmospheric pressure, a polymerizable carbonyl carbon-containing ringed molecule. The superatmospheric pressure is so chosen, at the elevated temperature, as to cause the ring portion of the ringed molecule to open in the vicinity of the carbonyl carbon thereof in response to the presence of the nucleophilic or the electrophilic moiety of the ethylenically-unsaturated monomer expressly excluding utilization of a catalyst for the carbonyl carbon-containing ringed molecule.

17 Claims, 1 Drawing Sheet

OTHER PUBLICATIONS

Shiota et al.—"Ionic Graft Copolymerization . . . ", Journal of Applied Polymer Science, vol. 11, pp. 773–790 (1967).
Shiota et al.—"Ionic Graft Copolymerization . . . ", Journal of Applied Polymer Science, vol. 12, pp. 2441–2461 (1968).
Shiota et al.—"Ionic Copolymerization . . . ", Journal of Applied Polymer Science, vol. 12, pp. 2463–2480 (1968).
Theodore et al.—"Modification of Acrylic Polymers . . . ", Journal of Coatings Technology, vol. 54, No. 693 at pp. 77–81 (Oct. 1982).
Encyclopedia of Polymer Science & Technology, vol. 11, Interscience Publishers, New York, 1969, pp. 98–106.
"Ring Opening Polymerization", vol. 3, by Ivin and Saegusce, Elsevier Science Pub. Co., Inc., New York, (1984) pp. 461–521, 975, and 978–979.

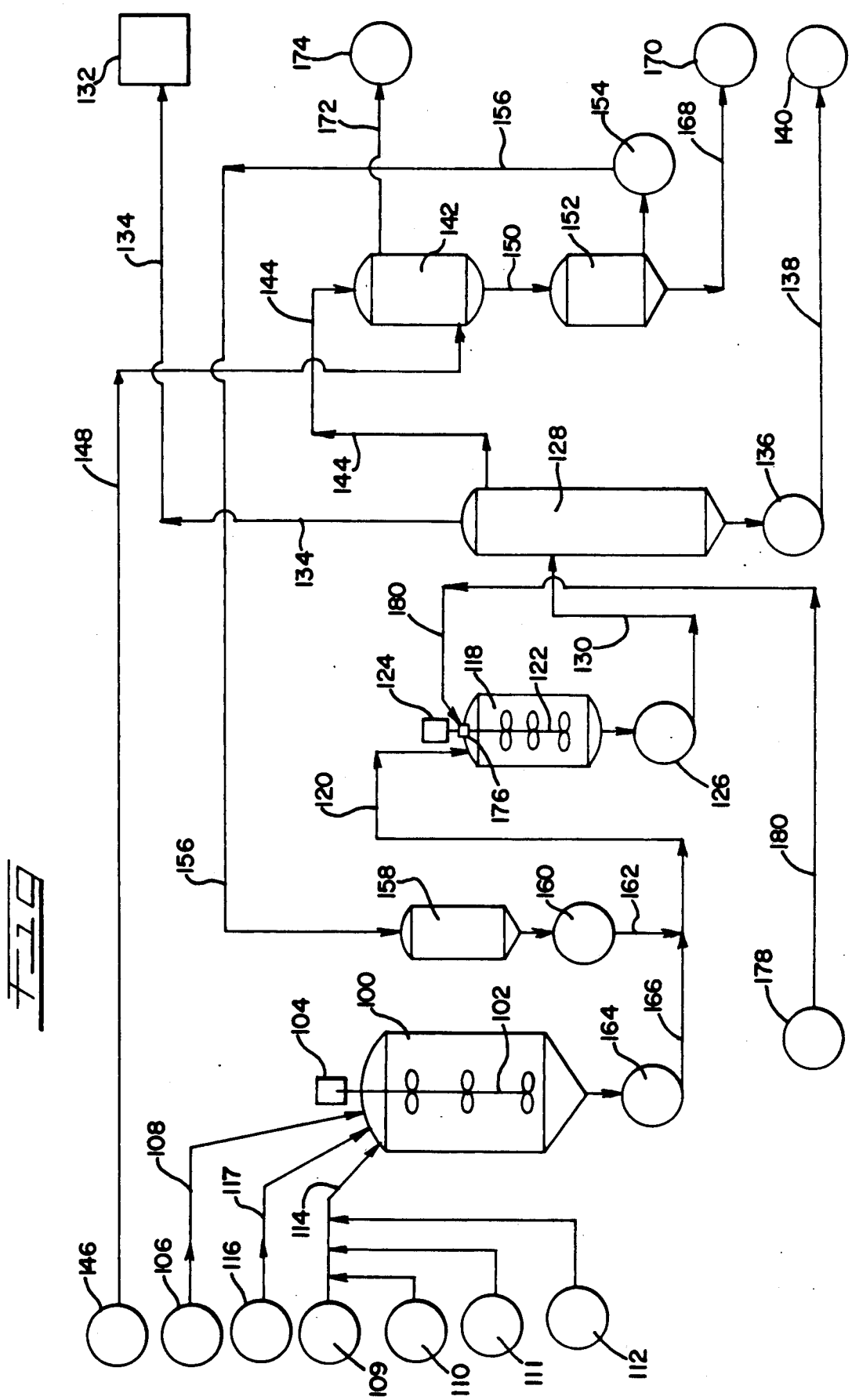

PROCESS AND APPARATUS FOR PRODUCING POLYOL POLYMERS AND POLYOL POLYMERS SO PRODUCED

REFERENCE TO RELATED APPLICATIONS

This application is a continuation-in-part of U.S. Application Ser. No. 07/356,647 filed 19 May 1989 now U.S. Pat. No. 4,933,430, which is a continuation of U.S. Application Ser. No. 07/022,297 (now abandoned) filed 5 March 1987, the benefit of which is now claimed for purposes of priority pursuant to 35 USC § 120.

This application is also related to U.S. Application Ser. No. 07/353,202 filed 12 May 1989, which is a continuation of U.S. Application Ser. No. 07/137,119 (now abandoned) filed 23 December 1987.

TECHNICAL FIELD

One aspect of our invention is directed to a process as well as to an apparatus for producing a novel polyol polymer. The polyol polymer structurally consists of at least one main chain and a plurality of pendant side chains.

Another aspect of our invention is directed to the process for producing our novel polyol polymer, whereby simultaneous grafting-and-additon polymerization-reaction mechanisms respectively cause the side chains and the main chain of the polyol polymer to form.

A yet further aspect of our invention is directed not only to that process for producing the novel polyol polymer, but further includes those process steps which enable such a polyol polymer to be formulated into a thermoset coating. Such a polyol polymer can, for example, be utilized to produce a thermoset coating having a number of useful, desired, physical properties such as superior hardness and flexibility, as well as excellent impact resistance.

BACKGROUND ART

It is often desirable in a polymer-coating "surface" application that a thermoset coating composition possess not only relatively large "hardness" and "scratch resistance" values but also relatively large "degree-of-flexibility" and "impact resistance" values. Unfortunately, in the production of a typical "coatings" polymer of this type, some of the process parameters that control the physical properties of such a polymer seem to be undesirably linked. For example, when certain process variables are selectably controlled so as to produce a thermoset coating composition possessing certain acceptable or desirable hardness and scratch resistance values, such a polymer generally is found to possess little, if any, flexibility and impact resistance, which is of course undesirable and in some applications totally unacceptable. In contradistinction, a polymer that is so produced as to possess desirable flexibility and impact-resistance values typically also is found to possess an unacceptable hardness and/or scratch-resistance value. It is currently believed that conventional manufacturing processes and methods cause these physical properties to be so related.

Briefly, conventional manufacturing processes can be summarized as follows. Many polymeric thermoset coating compositions that can be utilized in a polymer-coatings application are typically produced from preselected monomers, utilizing a series of manufacturing steps. Specifically, and as an example, such a conventional polymer often comprises a main chain, and typically includes side chains appended to the main chain. The main chain and pendant side chains, in particular, are furthermore typically formed at different times via separate reaction mechanisms, often utilizing separate reaction equipment to produce the desired polymer product. U.S. Pat. Nos. 3,892,714 and 4,005,155, both to Sampson et al., disclose processes that are fairly typical of such a conventional reaction scheme.

However, from for example an engineering standpoint, from a capital-investment standpoint, from a manpower-utilization standpoint, from an equipment-scheduling standpoint, and from a product-manufacturing standpoint, it would be not only desirable but also economical to effect the main-chain as well as the side-chain formations of such a polymer via a single, i.e. one-step, reaction mechanism, if possible.

Furthermore, it is also fairly typical, in many of the known, conventional polymer coatings-manufacturing processes, to utilize a catalyst to effect the main-chain and/or the side-chain formation of the desired polymer product. See, in particular, U.S. Pat. Nos. 3,892,714 and 4,005,155, both to Sampson et al.

One disadvantage of utilizing a catalyst in conjunction with a one-step reaction mechanism is that the catalyst, which is typically utilized to effect the side-chain polymerization reaction, if also present when the main-chain polymerization reaction takes place, can undesirably interfere with the main-chain polymerization reaction. This, in turn, may result in the production of a polymer product having undesirable properties, or may result in the production of an undesirable polymerization by-product that needs to be separated from the desired polymer product.

The catalyst that is typically utilized to effect a particular side-chain polymerization reaction, moreover, may cause transesterification at the main-chain portion of the polymer, resulting in undesired crosslinking of certain portions of the thus-produced polymer product. Such a result is undesirable because such crosslinking tends to increase the viscosity of the thus-produced polymer product in its polymerization solvent, and may even result in the gellation of the polymer product (or products) thus produced, which is of course usually undesirable as well.

It would therefore further be desirable not only to be able to produce such polymer products via a one-step reaction mechanism but also to be able to produce such polymer products without requiring the presence of catalyst, which would otherwise be needed to effect desired side-chain polymerization.

We have discovered that a novel polymer product of this type (e.g. a "polyol" polymer) can be produced via a one-step polymerization-reaction process. Such a process utilizes, for example, a single reaction vessel, while the main chain and side chains of such a polymer product are being formed substantially simultaneously. That is, we have discovered a one-step polymerization reaction mechanism that involves at least two different polymerization reactions which take place —we believe— substantially simultaneously.

We have advantageously also discovered that this particular dual-reaction mechanism can proceed without need of catalyst, which might otherwise conventionally be required to effect the side-chain polymerization.

Surprisingly, we have further discovered, by selectively controlling certain variables of our process, that we thus are able to produce a novel polyol polymer which, in turn, can be utilized to produce certain polymeric thermoset coatings possessing not only relatively large "hardness" and "scratch resistance" values but which also possesses relatively large "degree-of-flexibility", "resiliency", and "impact resistance" values as well.

SUMMARY DISCLOSURE OF INVENTION

Accordingly, one aspect of our present invention is directed to a process and to an apparatus for producing a novel polyol polymer that is useful in the formulation of certain thermoset coatings, as well as to the novel polyol polymer itself. The novel polyol polymer, generally characterized as having at least one main chain and a plurality of side chains appended or attached to the main chain (and thus also referred to herein as a "graft" polymer), is more fully described further hereinbelow. The details of our novel process are summarized immediately hereinbelow.

In our process, we contemplate combining at an elevated reaction temperature and for a predetermined period of time an (1) addition-polymerizable monomer that is also a free-radical initiator together with an (2) ethylenically-unsaturated monomer that has a nucleophilic or an electrophilic moiety. The preferred nucleophilic moiety is the hydroxyl moiety. The elevated temperature is so chosen as to be effective for initiating desired "addition copolymerization" of the addition-polymerizable monomer with the ethylenically-unsaturated monomer. Propagation by the addition-copolymerization reaction mechanism, while the elevated temperature is being maintained, causes the main chain of the novel polyol polymer to form.

Meanwhile, also combined with the addition-polymerizable monomers, at a preselected superatmospheric pressure, is a polymerizable, carbonyl carbon-containing, ringed molecule. The superatmospheric pressure is so chosen, at the elevated temperature, as to cause the ring portion of the ringed molecule to open in the vicinity of the carbonyl carbon thereof in response to the presence of the nucleophilic or the electrophilic moiety of the ethylenically-unsaturated monomer. Such a ring-opening mechanism initiates desired ionic-copolymerization of the polymerizable, ringed molecule with the nucleophilic-containing or electrophilic-containing moiety of the ethylenically-unsaturated monomer. Propagation by the ionic-copolymerization reaction mechanism, while the elevated temperature is being maintained, thus causes the side chains of the novel polyol polymer to form.

Termination of the addition-copolymerization reaction as well as termination of the ionic-copolymerization reaction can be selectably effected, for example, when our novel polyol polymer attains a predetermined number-average and/or weight-average molecular weight. Our novel polymerization process is thus characterized in that each of the main-chain and side-chain propagations occurs—we believe—substantially simultaneously, relative to the other, and is further characterized in that the ionic-copolymerization reaction occurs expressly excluding utilization of a catalyst for the carbonyl carbon-containing ringed molecule.

BRIEF DESCRIPTION OF THE FIGURE

The accompanying FIGURE is a process flow diagram illustrating an apparatus (or system) embodying certain principles of the process of our present invention.

BEST MODE FOR CARRYING OUT THE INVENTION

While our present invention is susceptible to embodiment in various forms, there is hereinafter described in detail a number of examples embodying the principles of our present invention. The present disclosure, therefore, is to be considered as merely an exemplification of our present invention without limitation to the specific embodiments or examples discussed herein.

In the ensuing detailed description, certain terms will be utilized for purposes of conciseness and otherwise to elucidate the various features and advantages of our present invention. These terms are defined hereinbelow.

The term "addition polymerization" as used herein relates to certain polymer chain-forming reactions wherein the agent that is utilized to effect formation of the polymer chain is an ionic species or another suitably-reactive substance with either of these having at least one unpaired electron that is able to function as a "free radical". A free radical is, broadly speaking, a species that is capable of "reacting" in a manner so as to (1) open the double bond of an ethylenically-unsaturated monomer and (2) attach itself to such monomer at the double bond thereof, thereby causing a polymer chain to begin growing, thus leaving an unpaired electron which, in turn, can function as the subsequent free radical species to further propagate the chain. Typically, and in a relatively short period of time (e.g., usually a few seconds or less), several monomer units can successively add to the thus-growing chain (via the double-bond-opening mechanism described immediately above). Finally, two of the hereinabove-described "free radical" species react with each other in a manner so as to terminate their mutual growth activity, thereby forming one or more polymer molecules. The term "addition polymerization" thus contemplates discrete "initiation", "propagation", and "termination" steps.

The term "ambient conditions" is herein understood to mean ambient temperature, namely 20° to 25° C., and ambient pressure, about 14.7 psia.

The term "amyl" as used herein means the five-carbon aliphatic group $C_5H_{11}$, also known as "pentyl". Eight isomeric arrangements (exclusive of optical isomers) are possible for an amyl moiety.

The term "atmospheric pressure" as used herein means 14.7 pounds per square inch absolute ("psia"), or an equivalent such as 760 millimeters of mercury, sometimes abbreviated 760 mm. Hg.

The term "carbonyl carbon" as used herein refers to that functional carbon atom which is depicted as:

The term "catalyst" as used herein refers to a substance which affects the rate of a particular chemical reaction. While thus affecting the rate of such a chemical reaction, the catalyst is not itself consumed nor does the catalyst itself undergo a chemical change. (See, e.g., pages 205-206 of "The Condensed Chemical Dictionary", 10th ed., published 1981 by Van Nostrand Reinhold Co.)

The term "coating", which includes the term "film", as used herein means a composition of matter that adheres to, covers, or is spread over, a surface (i.e., a substrate).

The terms "electrophile" and "nucleophile" as used herein are defined with respect to certain acid-base reactions in relation to the manner in which each shares an electron. Specifically, in connection with the terms "electrophile" and "nucleophile", a "base" donates an electron pair via e.g. a typical covalent bonding mechanism and an "acid" accepts such an electron pair. The electron-accepting "acid" is thus referred to as an "electrophile", and the electron-donating "base" is thus referred to as a "nucleophile".

The term "elevated temperature" as used herein means any temperature above room temperature (i.e., above 25° C.).

The term "free radical", mentioned above, and in accordance with our present invention, is further understood as meaning that addition polymerization-inducing moiety, sometimes also called an "initiator", which can at times be formed via decomposition of a relatively unstable substance.

The term "film" as used herein connotes either a veneer, a relatively fine or thin skin, a delicate coating on a surface, an outer membrane, or an ultrafine layer on a substrate.

The term "hydroxyl moiety" as used herein refers to that functional group which is structurally depicted as "—OH".

The term "inhibitor" as used herein connotes a compound, usually organic in composition, that can be utilized to retard or stop a particular chemical reaction. (See, e.g., pages 561–562 of "The Condensed Chemical Dictionary", 10th ed.)

The term "initiator" connotes any agent that is utilized for the purpose of starting (i.e., "initiating") a particular polymerization reaction. During the course of a particular polymerization reaction involving utilization of an initiator, the initiator is consumed. (A "free-radical" agent, occasionally an alternative name for the term "initiator", is thus not to be confused with the term "catalyst" which is defined hereinabove.) Organic peroxides and similar compounds are often used as polymerization-reaction "initiators" (See, e.g., page 562 of "The Condensed Chemical Dictionary", 10th ed.)

The term "ionic polymerization" as used herein typically involves the transfer of an ion, or an ionic species, or at least one electron to (or from) a monomer or a monomeric species, resulting in the formation of at least one ion pair. In this regard ion-pair formation typically arises during the initiation step of an ionic-polymerization reaction. While not wanting to be tied to theory, yet desirous of providing a full disclosure of our invention, it is presently postulated that the counter-ion of such an ion pair remains in the immediate vicinity of the growing-polymer chain-end throughout the lifetime thereof (i.e., during the propagation of the polymer chain), particularly in media of low dielectric constant. "Ionic polymerization" (like "addition polymerization", mentioned above) thus also contemplates discrete "initiation", "propagation", and "termination" steps.

The term "lactone" as used herein generally means a cyclic ester.

The term "main-chain polymerization" as used herein connotes the initiation, propagation and termination of the main chain of the polymer, wherein the monomeric units thus forming the main chain are added together, typically in a random order if differing monomeric species are present, via the "addition polymerization" mechanism discussed above.

The term "monomer" as used herein means that polymerizable starting material from which a particular polymer is formed. The term "monomer" as used herein thus includes "oligomers", as well as certain other polymers that are further polymerizable.

The term "$M_z$" as used herein is one particular polymeric molecular weight measure, also referred to as the so-called "sedimentation-average" molecular weight, as defined in U.S. Pat. No. 4,529,787 to Schmidt et al. (assigned to S. C. Johnson & Son, Inc., of Racine, Wisconsin) which term is hereby incorporated by reference.

The term "oligomer" as used herein means a polymer molecule which, although perhaps consisting of only a relatively few number of monomeric units, is further polymerizable. In particular, the term "oligomer" as used herein generally connotes a relatively short-chain polymer molecule comprising about 2 to about 30 monomeric units.

The term "polydispersity" as used herein is hereby defined as either (1) $M_w/M_n$, which is more particularly referred to as the ratio of the weight-average molecular weight to the number-average molecular weight, or (2) its related term, $M_z/M_n$, which is more particularly referred to as the ratio of the sedimentation-average molecular weight to the number-average molecular weight. The terms $M_w/M_n$ and $M_z/M_n$ are thus herein utilized for purposes of quantifying the breadth of the molecular weight distribution of the novel polyol polymer produced via the process of our present invention.

The term "polymer" as used herein means a macromolecule formed by the chemical union of monomeric units. When two or more monomeric units are so united, the macromolecule that is formed as a result may be referred to as a copolymer, a terpolymer (if three distinct monomeric units are so utilized), a tetrapolymer (if four distinct monomeric units are so utilized), and so on. Typically, the macromolecule that is thus-formed includes at least one main chain and may include a plurality of side chains attached to each such main chain; however, and in accordance with the principles of the present invention, it is contemplated that each such main chain can include only a few side chains, if such is desired. Crosslinking, moreover, as between the several different types of chains may be present in a variety of ways.

The term "SGA polymerization" is hereby defined as the simultaneous graft-and-addition polymerization-reaction mechanism mentioned hereinabove. Briefly, SGA polymerization as herein defined means simultaneous side-chain and main-chain polyol polymer formation. In particular, as the novel polymer main chain propagates, portions of the main chain that have an electrophilic moiety or a nucleophilic moiety may cause the polymerizable, ringed monomeric species that is present and that is able to ring-open to graft onto at least some of these moieties. In other words, when the nucleophilic moiety is, for example, a hydroxyl moiety (which would thus be attached to an acrylic-based portion of the polyol polymer main chain), and when the ringed monomeric species is, for example, a lactone such as epsilon-caprolactone (CAP), the presence of the main-chain hydroxyl moiety causes the CAP ring-portion of the CAP molecule to open and to graft onto the main chain portion of the thus-propagating polyol polymer. The CAP-based side chain, moreover, has its own hydroxyl tail; and additional CAP monomer may thus graft onto another hydroxyl moiety on the growing main chain or may graft onto that hydroxyl moiety which extends from the CAP-based side chain of the thus-propagating polyol polymer.

The term "side-chain polymerization" as used herein connotes the initiation, propagation and termination of a side chain (of the polyol polymer) from the main chain of the polyol polymer. While not wanting to be tied to theory, yet desirous of providing a complete disclosure, it is presently theorized that side-chain polymerization, as discussed herein, results from "ionic" polymerization.

The term "superatmospheric pressure" as used herein means a pressure that is greater than atmospheric pressure.

The term "thermoset polymer" as used herein connotes a polymer that solidifies or otherwise "sets" irreversibly upon heating. This property is usually associated with a crosslinking reaction of the molecular constituents of such a polymer, such crosslinking reaction being induced, for example, by heat, by radiation, or by other means. In many instances, it is necessary to add to the polymer a "curing" agent, such as an organic peroxide, to effect thermosetting.

One aspect or feature of our present invention, as was briefly mentioned above, is thus directed to a process as well as to an apparatus (or system) for producing a novel polyol polymer. The novel polyol polymer, also referred to as a "graft" polymer, consists of at least one polymeric main chain and a plurality of polymeric side chains attached or appended to the main chain.

Another aspect or feature of our invention is directed to such a process (i.e. that process for producing the novel polyol polymer), whereby simultaneous grafting-and-addition polymerization-reaction mechanisms respectively cause the side chains and the main chain of the novel polyol polymer to form.

Yet another aspect or feature of our invention is directed to the thus-produced, novel polyol polymer itself.

Still another aspect or feature of our present invention is directed to that process for producing our novel polyol polymer, which further includes those process steps whereby the polyol polymer is formulated into a thermoset coating.

Referring now to our novel process, we contemplate combining at an elevated reaction temperature and for a predetermined period of time an (1) addition-polymerizable monomer that is also a free-radical initiator together with an (2) ethylenically-unsaturated monomer that has a nucleophilic or an electrophilic moiety. The preferred nucleophilic moiety is the hydroxyl moiety.

Briefly, the addition-polymerizable monomer functions as a free-radical initiator (or so-called free-radical "generator") at the elevated reaction temperatures of the present invention, as will be described in greater detail below. The preferred polymerizable free-radical initiator is selected from the group consisting of styrene, as well as various other monoalkenyl aromatic monomers such as alpha-methyl methyl styrene, ortho-chlorostyrene, tertiary-butyl styrene, vinyl toluene, and mixtures of these.

The elevated temperature is so chosen as to be effective for initiating addition-copolymerization of at least one addition-polymerizable monomer with at least one ethylenically-unsaturated monomer. Preferably, the ethylenically-unsaturated monomer is selected from the group consisting of an acrylate monomer, a methacrylate monomer, other monomers capable of being polymerized by free-radical addition polymerization, and mixtures of these. Propagation by the addition-copolymerization reaction mechanism, while the elevated reaction temperature is being maintained, causes the main chain of the polyol polymer to form. Furthermore, certain other additional monomeric species, as was briefly noted above, such as methyl methacrylate and/or butyl acrylate, can advantageously be incorporated into the thus-propagating main chain if desired. Accordingly, the main chain of the polyol polymer disclosed herein can comprise a number of distinct monomeric units.

Meanwhile, also combined with the addition-polymerizable monomers, at a preselected superatmospheric pressure, is a polymerizable, carbonyl carbon-containing ringed molecule. The superatmospheric pressure is so chosen, at the elevated temperature, as to cause the ring portion of the ringed molecule to open in the vicinity of its carbonyl carbon in response to the presence of the nucleophilic moiety or the electrophilic moiety of the ethylenically-unsaturated monomer.

Preferably, the two, above-mentioned "combining" steps take place in the liquid phase in, for example, a pressurized reaction vessel of suitable size, utilizing agitation. Solvent, which is optional, may be used for better-controlling the reaction conditions, if desired. For example, it might be desirable to utilize solvent to control the temperature and/or viscosity of the reaction mixture.

In any event, yet another aspect or feature of our present invention is directed to a continuous process for continuously producing the novel polyol polymer. In accordance with still another aspect or feature of our present invention, solvent, if employed, without the three above-mentioned monomers, can be preheated to the desired reaction temperature, and thereafter the three above-mentioned monomers can be admixed thereinto or combined therewith or, in the alternative, the solvent containing the three thus-admixed or thus-combined monomers can be heated from any lesser temperature to the desired reaction temperature.

The above-mentioned ring-opening mechanism initiates ionic-copolymerization of the polymerizable, ringed molecule with the nucleophilic-containing or electrophilic-containing moiety of the ethylenically-unsaturated monomer. Propagation by the ionic-copolymerization reaction mechanism, as a result of the presence of the ionic copolymerization reaction ingredients, thus forms the side chains of the polyol polymer. Termination of both the addition-copolymerization and ionic-copolymerization reactions can be selectably effected, for example, when the novel polyol polymer attains a predetermined number-average and/or weight-average molecular weight.

Preferably, termination of these reactions is effected when the above-mentioned, desired polyol polymer attains a preselected polydispersity value, a preselected viscosity value, a preselected sedimentation-average molecular weight value, and/or a preselected glass-transition temperature (Tg) value.

Our polymerization process is further characterized in that each of the polymer main-chain and side-chain propagation steps discussed above occurs—we believe—substantially simultaneously, relative to the other; and our polymerization process is even further characterized in that the ionic-copolymerization reaction occurs expressly excluding utilization of a catalyst for the carbonyl carbon-containing ringed molecule.

The polyol polymer produced by our process, technically referred to as a "polyol" because it is a polyhydric alcohol, preferably has a number-average molecular weight of about 700 to about 15,000; more preferably has a number-average molecular weight of about 1,000 to about 10,000; still more preferably has a number-average molecular weight of about 1,000 to about 7,000; and most preferably has a number-average molecular weight of about 1,000 to about 3,000.

Upon termination of the polymer-chain propagation steps, as described above, the above-mentioned polyol polymer can be separated from the solvent and recovered if desired.

While not wanting to be tied to theory, yet desirous of providing a complete disclosure, it is presently believed that main-chain polymerization proceeds in a self-initiated manner, at a predetermined elevated reaction temperature, when a free radical-generating ingredient—such as styrene, for example—is used as the addition-polymerizable monomer which, at the elevated temperature, provides the above-discussed addition-polymerization free-radical initiator.

More particularly, it is presently postulated that four molecules of the free radical-generating ingredient (e.g. styrene monomer) react spontaneously at room temperature to produce two molecules of an unstable so-called "Diels-Alder adduct", such as is depicted in Equation 1 below.

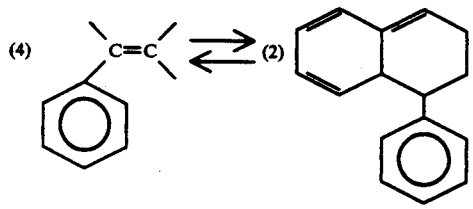

(Eq. 1)

Further, and as is also shown in Equation 1, the thus-produced free radical-generating ingredient (e.g. the styrene monomer) as well as the unstable Diels-Alder adduct are believed to co-exist as a mixture in a state of equilibrium, depending at least in part upon the temperature to which these ingredients are subjected and the amount, if any, of inhibitor present.

Raising the temperature of the equilibrium mixture above room temperature (i.e. above 25° C) to the desired elevated reaction temperature, in the presence of excess free radical-generating generating monomer, is thus believed to convert two molecules of the unstable Diels-Alder adduct (represented by the chemical structure located on the right-hand side of the equilibrium arrows depicted in Equation 1 above), presumably via molecule-induced homolysis, into monoradicals that are capable of initiating polymerization, as is depicted in Equation 2 below.

(Eq. 2)

When the addition-polymerizable monomer that is able to provide addition-polymerization free-radical initiation is styrene, the elevated reaction temperature is preferably about 100° to about 350° C; more preferably, the elevated reaction temperature is about 150° to about 300° C; and most preferably, the elevated reaction temperature is about 190° to about 270° C. Other suitable addition-polymerizable monomers —such as alpha-methyl styrene, ortho-chlorostyrene, tertiary-butyl styrene, vinyl toluene, and certain other monoalkenyl aromatic monomers—that are able to thus provide respective addition-polymerization free-radical initiators in accordance with the principles of our invention will of course have different preferred, more-preferred and most-preferred elevated reaction temperature ranges.

The symbol "R • " is hereinafter used to refer either to one, or to the other, or to both, of the two, above-depicted chemical structures, shown in Equation 2 as having the free radical-containing carbon atoms. These monoradicals are thus hereinafter simply referred to by the symbol "R • ".

Meanwhile, the further combining of (1) whatever residual addition-polymerizable monomer of this sort that is present with (2) the above-mentioned ethylenically-unsaturated polymerizable monomer having the nucleophilic moiety or the electrophilic moiety, at the elevated reaction temperature and in the presence of the free radicals R • , is believed to result in the main-chain growth of the polyol polymer, as is depicted in Equation 3 below. Further, some of the free radicals become the end-cap moiety "R", as is shown below in Equation 3 in connection with an intermediate "product", which is located on the right-hand side of the equation.

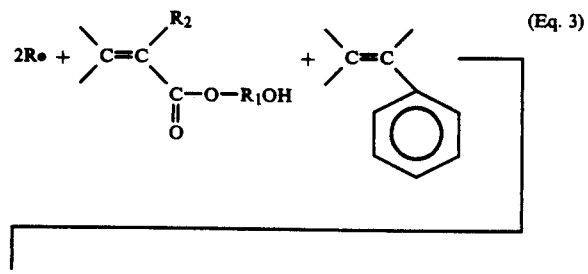

(Eq. 3)

-continued

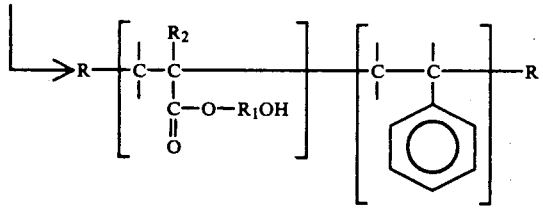

where "R" is as discussed hereinabove; where "$R_1$" can be as discussed hereinbelow; where "$R_2$" is —H, —$CH_3$, or $(CH_2)_xCH_3$; and where x=1 to 10.

For example, when the ethylenically-unsaturated polymerizable monomer has a nucleophilic moiety, such as hydroxyl, the symbol "$R_1OH$" appearing in Equation 3 can be substituted by a ring-opened carbonyl carbon-containing formerly-ringed molecule, or —$(CH_2)_yOH$, where y=1 to 10, or can be substituted by —$CH_2CH(OH)CH_3$, —$CH_2CH(OH)CH_2Cl$, —$CH_2CH(OH)CH_2CH_3$, a 6-hydroxyhexyl moiety, a 5,6-dihydroxyhexyl moiety, and the like, and mixtures of these, wherein the symbol "$R_1$" connotes the above substitutions with the removal of a hydroxyl moiety.

In particular, the hydroxyalkyl acrylates, the hydroxyalkyl methacrylates, and the methyl alpha-hydroxyalkyl acrylates, as well as mixtures of these, are particularly suitable; and more particular examples of suitable acrylates and methacrylates include hydroxypropyl acrylate, 2-hydroxyethyl acrylate, hydroxybutyl acrylate, 2-hydroxypropyl methacrylate, 2-hydroxy-3-chloro propyl methacrylate, 2,3-dihydroxy propyl methacrylate, and 2,3-dihydroxy propyl acrylate, and the like, and mixtures thereof. Hydroxyethyl acrylate and hydroxyethyl methacrylate are most preferred.

The main chain of the intermediate "product" shown in Equation 3 comprises an addition-polymerizable monoalkenyl aromatic monomeric unit and a nucleophilic (or electrophilic) moiety-containing monomeric unit; and at the end portions of the chain are the above-mentioned free-radical initiator species having monomeric units that are derived from the unstable Diels-Alder molecule-induced homolysis products, mentioned above.

In addition to styrene, there are other monoalkenyl aromatic monomers, such as alpha-methyl styrene, ortho-chlorostyrene, tertiary-butyl styrene, vinyl toluene, and mixtures thereof, and the like, as well as certain nonaromatic molecules, such as 1,3-butadiene, 1,3,5-hexatriene, and other like unsaturated monomers, as well as mixtures of these, which are capable of forming unstable, Diels-Alder adducts, and which are able to function as free-radical generators in accordance with the principles of our present invention.

In our process we further contemplate the additional step of also combining with the addition-polymerizable monomers, namely with the free radical-initiating monomer and the nucleophilic or electrophilic moiety-containing ethylenically-unsaturated monomer, at a preselected superatmospheric pressure, a polymerizable, carbonyl carbon-containing, ringed molecule, such as the lactone illustrated hereinbelow. The superatmospheric pressure is so chosen, at the elevated reaction temperature, as to cause the ring portion of the ringed molecule to open in the vicinity of the carbonyl carbon thereof in response to the presence of the nucleophilic (or electrophilic) moiety of the ethylenically-unsaturated monomer. While not wanting to be tied to theory, yet desirous of providing a complete disclosure, such a ring-opening mechanism is currently believed to result in the ionic-copolymerization initiation of the side-chain reaction, as is depicted in Equation 4 below.

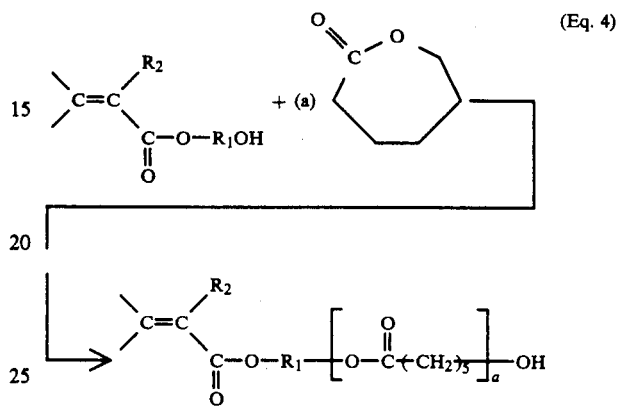

(Eq. 4)

where "a" is an integer of from 1 to 50 inclusive.

In Equation 4, epsilon-caprolactone ("CAP") is depicted as being illustrative of such a lactone.

In addition to the above-mentioned hydroxyl group-containing acrylate and methacrylate monomers, other suitable hydroxyl moiety-containing ethylenically-unsaturated monomers include para-hydroxystyrene, as well as methyl alpha-hydroxyalkyl acrylates, which are structurally shown as:

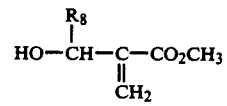

where $R_8$ can be —$CH_3$, or —$C_2H_5$, while yet another suitable hydroxyl moiety-containing ethylenically-unsaturated monomer includes methyl alpha-hydroxymethacrylate (MHMA), which is structurally shown as:

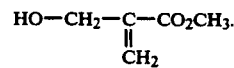

Still not wanting to be tied to theory, yet still desirous of providing a complete disclosure, it is presently postulated that simultaneous graft/addition proceeds generally as follows. In particular, it is believed that addition-copolymerization proceeds generally in accordance with equations 1 through 3, at the elevated reaction temperature, while ionic-copolymerization proceeds generally simultaneously therewith and in accordance with equation 4, at the superatmospheric pressure while maintaining the elevated temperature. The following structure is accordingly believed to be representative of the thus-produced polyol product.

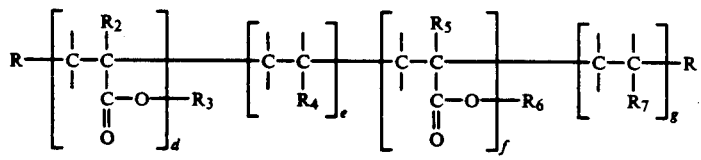

where "R" is as discussed hereinabove; where "R$_1$", and "R$_2$" are as defined hereinabove; where "R$_3$" is R$_1$OH or

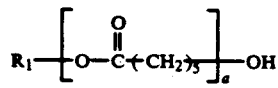

wherein "a" is as defined hereinabove; where "R$_4$" is

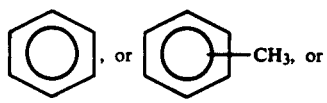

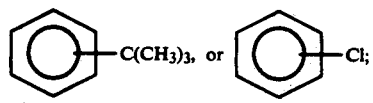

where "R$_5$" is —H, —CH$_3$, or (CH$_2$)$_x$CH$_3$, wherein "x" is as defined hereinabove; where "R$_6$" is R$_1$OH or

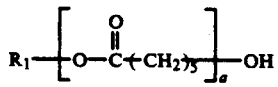

wherein "a" is as defined hereinabove; where "R$_7$" is —H, —CH$_3$, or (CH$_2$)$_x$CH$_3$, wherein "x" is as defined hereinabove; where "d"+"f" is an integer of from about 1 to about 500; and where "e"+"g" is an integer of about 1 to about 500.

A solvent, if utilized, is so chosen as to achieve the addition-copolymerization and ionic-copolymerization reactions disclosed herein, hereinafter simply referred to as the above-defined and discussed "SGA polymerization process" reactions. Accordingly, any such solvent should not contain hydroxyl groups, as such would tend to compete with any hydroxyl moiety-containing ethylenically-unsaturated monomer that may be present, which would result in undesirable ring-opening of the polymerizable, carbonyl-carbon-containing ringed molecule.

As was mentioned above, a preselected superatmospheric pressure is so chosen as to effect ionic-copolymerization, at the elevated reaction temperature, of the carbonyl carbon-containing ringed molecule with the ethylenically-unsaturated monomer.

As a practical manner, however, and because solvents that may be utilized in accordance with the principles of the present invention are substantially all generally relatively volatile, to varying degree, a suitable solvent having a sufficiently high boiling point may typically be chosen such that the solvent vapors do not overpressurize the particular polymerization reactor that is being utilized to effect an elevated reaction temperature of about 100° to about 350° Centigrade (when utilizing styrene as the free-radical initiator). In such a case, such a solvent, if employed, is so chosen such that the reaction pressure ranges from approximately slightly more than about atmospheric pressure (i.e., more than about 14.7 pounds per square inch absolute) to about 1000 pounds per square inch absolute (psia); preferably the reaction pressures may range from more than about 30 psia atmospheric pressure to about 400 psia; and more preferably the reaction pressures may range from more than about 40 psia to about 300 psia. Most preferably, the solvent, if employed, may be so chosen such that the reaction pressure is about 60 psia to about 200 pounds per square inch absolute (psia), at the reaction temperatures of about 100 degrees to about 350 degrees Centigrade, preferably between about 190 degrees to about 270 degrees Centigrade.

Illustrative of the various kinds of optional solvents that may be utilized in accordance with the principles of the present invention are those that are well known in the art, such as, PM acetate, cyclohexanone, toluene, methyl isobutyl ketone (MIBK), tetrahydrofuran, acetone, 1,3-dioxane, 1,4-dioxane, ethyl acetate, hexane, ethyl benzene, diethyl carbitol, dimethyl carbitol, diethyl cellosolve, cellosolve acetate, glyme, diglyme, triglyme, methyl amyl ketone (MAK), ethoxy ethyl acetate, xylene, methyl ethyl ketone (MEK), ethyl benzene, and the like, and mixtures thereof.

The higher-boiling solvents may be preferred, due to their relatively lower vapor pressures at high temperatures. In general, solvents having boiling point temperatures above about 100° C. may be more preferred. Solvents having boiling point temperatures of about 150° C. and above may be most preferred.

Preferred solvents, if solvents are to be employed, include butyl acetate, MAK, PM acetate (propylene glycol monomethyl ether acetate), toluene, xylene, dimethyl cellosolve, glyme, diglyme, triglyme, diethyl carbitol, diethyl cellosolve, and cellosolve acetate—with PM acetate, butyl acetate, MAK, diethyl carbitol, diethyl cellosolve, and cellosolve acetate, being more preferred.

Illustrative of suitable polymerizable, carbonyl carbon-containing, ringed molecules—in addition to the above-mentioned lactones—are the following polymerizable ringed molecules:

lactams, such as caprolactam:

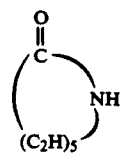

cyclic anhydrides, such as dioxane-2,6-dione:

cyclic carbonates, such as ethylene carbonate [1,3-dioxolane-2-one]:

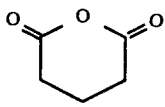

cyclic oxaltes, such as ethylene oxalate [1,4-dioxane-2,3-dione]:

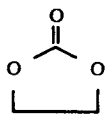

certain diox-one compounds, such as 1,4-dioxane-2-one:

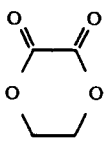

certain diox-dione compounds, such as glycolide [1,4-dioxane-2,5-dione]:

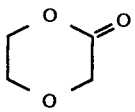

certain thio-derivatives, such as epsilon-thiolactone [thioxepane-2-one]:

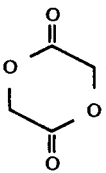

and 1,4-thioxane-3-one:

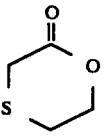

each of which has a ringed portion that opens up at a respective, predetermined elevated temperature and superatmospheric pressure when a nucleophile or an electrophile attacks the respective carbonyl carbon atom or ring structure portion thereof.

Illustrative of the various lactones that are suitable and therefore which can be utilized, are: gamma-butyrolactone, gamma-valerolactone, ethylene carbonate, tetramethylene carbonate, 2,2-dimethyl-4-phenyl-1,3-dioxolan-5-one, alpha-n-propyl-delta-valerolactone, delta,delta-dimethyl-delta-valerolactone, 3-ethyl-1,4-dioxan-2-one, 3,3,6-trimethyl-1,4-dioxan-2-one, tetramethyl glycolide, tetraphenyl glycolide, and 3-oxa-epsilon caprolactone.

Preferred lactones include beta-propiolactone, alpha,alpha-bis(chloromethyl)propiolactone, beta-butyrolactone, delta-valerolactone, alpha,beta,gamma-trimethoxy-delta-valerolactone, 1,4-dioxane-2-one, glycolide, lactide, 1,4-dithiane-2,5-dione, trimethylene carbonate, neopentyl carbonate, ethylene oxalate, beta-methyl-epsilon-isopropyl-epsilon-caprolactone, propylene oxalate, epsilon-caprolactone, lactones of 4-hydroxycyclohexane carboxylic acid, cis-disalicylide, di-o-cresotide, and trisalicylide.

Lactones most preferred—such as epsilon-caprolactone, beta-propiolactone, and beta-butyrolactone—are characterized by the following formula:

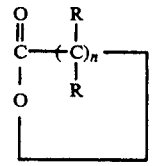

where R is hydrogen, alkyl, alkoxy, aryl, cycloalkyl, alkaryl, or aralkyl, where n is 3 to 11, and wherein at least six of the "R" groups are hydrogen atoms.

To control side-chain formation, it is at times desirable to utilize certain electrophilic moiety-containing ethylenically-unsaturated monomers, esters, derivatives, and mixtures.

In particular, such an ethylenically-unsaturated monomer is preferably an "acrylic monomer", wherein the term "acrylic monomer" as employed herein includes acrylic acid and methacrylic acid, esters of acrylic acid and methacrylic acid, and derivatives and mixtures thereof.

Examples of suitable acrylic monomers include the following methacrylate esters: methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl-methacrylate, tert-butyl methacrylate, 2-ethylbutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, and tetrahydropyranyl methacrylate.

Other suitable acrylic monomers include methacrylic acid derivatives such as: methacrylic acid and its salts, methacrylonitrile, methacrylamide, N-methylmethacrylamide, N-ethylmethacrylamide, N,N-diethylmethacrylamide, N,N-dimethylmethacrylamide, N-phenylmethacrylamide, and methacrolein.

Typical acrylate esters employed include: methyl acrylate, ethyl acrylate, n-propyl acrylate, isopropyl acrylate, n-butyl acrylate, and n-decyl acrylate.

Acrylic acid derivatives employed as the acrylic monomer include: acrylic acid and its salts, acrylonitrile, acrylamide, methyl alpha-chloroacrylate, methyl 2-cyanoacrylate, N-ethylacrylamide, N,N-diethylacrylamide, and acrolein.

The acrylic monomer can also include acrylates as well as methacrylates containing certain crosslinkable functional groups such as carboxyl, amino, isocyanate, glycidyl, epoxy, allyl, and the like.

Esters of methacrylic acid or acrylic acid containing a suitable, condensable crosslinkable functional group may be used as the acrylic monomer as well. Among such esters are t-butylaminoethyl methacrylate, isopropylidene glyceryl methacrylate, and oxazolidinylethyl methacrylate.

Generally, however, it is desirable to utilize a nucleophilic moiety-containing ethylenically-unsaturated monomer, to effect desired grafting of the carbonyl carbon-containing monomer onto the main chain of the polymer. As was mentioned above, the preferred nucleophilic moiety is the hydroxyl moiety.

Accordingly, suitable ethylenically-unsaturated monomers containing an hydroxyl group include unsaturated alcohols such as allyl alcohol; alkylol acrylamides or methacrylamides such as methylol acrylamide or methylol methacrylamide; and unsaturated hydroxyalkyl esters. Preferably, the hydroxyl-containing unsaturated monomer is an ethylenically-unsaturated hydroxyalkyl ester.

Reaction time to effect the addition-copolymerization reaction, at the predetermined superatmospheric pressure, can vary from about 30 minutes to about 12 hours depending upon reaction temperature, the particular equilibria of reacting species chosen, quantity and type of ring-opening polymerizable species (or ingredients) added, and so on.

While traditional initiators, such as the traditional "free-radical" initiators (briefly discussed above), are not necessary to effect simultaneous graft-addition (SGA) polymerization in accordance with the principles of our invention, it may be desirable to employ certain traditional initiators to obtain various desired results, as can be appreciated by those skilled in the art. Suitable initiators in this regard include, for example, aliphatic azo compounds such as 1-tert-amylazo-1-cyanocyclohexane, azo-bis-isobutyronitrile and 1-tert-butylazo-cyanocyclohexane and peroxides and hydroperoxides, such as tert-butylperoctoate, tert-butyl perbenzoate, dicumyl peroxide, di-tert-butyl peroxide, tert-butyl hydroperoxide and cumene hydroperoxide and the like. The particular initiator is not critical so long as the initiator will generate free radicals.

DETAILED DESCRIPTION OF EXAMPLES

The following examples are set forth to describe more particularly, to those skilled in the art, the principles and practice of this invention. As such, they are not intended to limit the invention but rather are merely illustrative of certain aspects of the various preferred embodiments. In these examples, the molecular weight of the polyol polymer product was determined by Gel Permeation Chromatography (GPC), using: a Waters 150C Chromatograph at 35° C., a total of five "micro" (i.e., $10^{-6}$ meters) so-called "Styragel" columns (i.e., $1 \times 10^5$, $1 \times 10^4$, $1 \times 10^3$, 500, and 100 Angstroms, pore sizes), and tetrahydrofuran as the solvent. The flow rate was 1 milliliter per minute (ml./min.), and 200 microliters of a 0.2 weight percent (wt.-%) solution was injected.

Thermal analyses were performed using a Du Pont Instrument 1090B/910 differential scanning calorimeter (DSC). The glass-transition temperature (Tg) of the thus-produced polyol polymer was deemed to be the temperature at the mid-point of the overall change in heat capacity associated with Tg.

EXAMPLE 1

One Method of Making the Polyol Polymer 150 grams of propylene glycol monomethyl ether acetate ("PM acetate") was introduced into an agitated 2-liter pressurized ("Parr") reactor, via an addition line, and was thereafter heated to a temperature of about 225 degrees Centigrade. A monomer mixture comprising 350 grams of styrene, 87.5 grams of 2-hydroxyethyl methacrylate ("2-HEMA") and 153.5 grams of epsilon-tone ("CAP") was then added, via the addition line, to the 225° C. PM acetate solvent over a period of about 1 hour. Upon completion of the addition of the monomer mixture, the addition line was flushed with about 47.5 grams of PM acetate. Thereafter, the SGA polymerization was allowed to run its course in the 2-liter reactor for about 4 hours. During the course of the polymerization reaction, samples were removed from the reactor at one-hour intervals for analysis by gas chromatography (GC) and gel permeation chromatography (GPC).

The percent-conversion of monomer to polyol polymer, together with the weight-average molecular weight of the polymer, $M_w$, as a function of reaction time, as determined by GC and GPC, can be summarized as follows:

TABLE I

| POLYMER CONVERSION RATES | | | | |
|---|---|---|---|---|
| Reaction Time, | | % Conversion of Monomer to Polymer, based upon: | | |
| Minutes | $M_w$ | Styrene | 2-HEMA | CAP |
| 60 | 11600 | 94 | 99 | 27 |
| 120 | 12400 | 98 | 99 | 41 |
| 180 | 13400 | 99 | 99 | 73 |
| 240 | 14200 | 100 | 100 | 86 |

Upon completion of the reaction, the hot polymer solution was removed from the reactor and allowed to cool. The now-cooled polymer solution was then analyzed by GPC and was found to have a number-average molecular weight ($M_n$) of 3600, a weight-average molecular weight ($M_w$) of 14200, a sedimentation-value molecular weight ($M_z$) of 28900, and polydispersity and related value ratios of $M_w/M_n = 3.94$ and $M_z/M_n = 8.03$, respectively. The viscosity of the polymer solution at room temperature (i.e., 25° C.) was 49600 centipoises (cPs.), as determined using a Brookfield viscometer. The percent-solids of the polyol polymer was 81 wt.-%. Successive dilutions of the polymer solution, made using additional PM acetate solvent, produced the following percent solids-viscosity profile:

TABLE II

| VISCOSITY PROFILE | |
|---|---|
| % Solids Polymer | Brookfield Viscosity (cPs.) |
| 81 | 49600 |
| 75 | 10700 |
| 70 | 5600 |
| 65 | 4400 |
| 60 | 2135 |

The glass-transition temperature (Tg) of the polyol polymer, after separation from the solvent, was found to be $-7°$ C., as determined by differential scanning calorimeter ("DSC").

EXAMPLE 2

Another Method of Making the Polymer

A procedure, similar to that of EXAMPLE 1, was used to prepare EXAMPLE 2, except that the reaction temperature of EXAMPLE 2 was 250° C. instead of 225° C. and the reaction time was 2 hours instead of 4 hours. During the course of the polymerization reaction, samples were removed from the reactor at 45-min., 60-min., 90-min., and 120-min. intervals, for GPC and GC analyses. The percent-conversion of monomer to polyol polymer together with the $M_w$ value of the polymer were monitored during the course of the reaction; and these values can be summarized as follows:

TABLE III

| POLYMER CONVERSION RATES | | | | |
|---|---|---|---|---|
| Reaction Time, | | % Conversion of Monomer to Polymer, based upon: | | |
| Minutes | $M_w$ | Styrene | 2-HEMA | CAP |
| 45 | 5010 | 96 | 99 | 86 |
| 60 | 5080 | 97 | 99 | 93 |
| 90 | 5090 | 98 | 99+ | 95 |
| 120 | 5310 | 99 | 99+ | 97 |

Upon completion of the polymerization reaction, the polymer product was allowed to cool to room temperature. GPC analysis indicated the following: $M_n=1870$, $M_w=5310$, $M_z=28900$, $M_w/M_n=2.84$, and $M_z/M_n=15.45$. The viscosity of the polymer product at room temperature was found to be 2800 cPs., as determined by Brookfield viscometer. The percent-solids wt.-% of the polyol polymer, based upon the total weight of the polymer-containing solution, was 74%. Successive dilutions of the polymer solution, made using additional PM acetate solvent, produced the following percent solids-viscosity profile:

TABLE IV

| VISCOSITY PROFILE | |
|---|---|
| % Solids Polymer | Brookfield Viscosity (cPs.) |
| 74 | 2800 |
| 70 | 1750 |
| 65 | 683 |
| 60 | 567 |

The Tg value of the polyol polymer, after separation from the solvent, was found to be $-12°$ C., as determined by DSC.

EXAMPLE 3

Yet Another Method of Making the Polymer

A procedure similar to that of EXAMPLE 1 was used to prepare EXAMPLE 3, except that the reaction was performed at 240° C. for 1 hour. During the course of the polymerization reaction, samples were removed from the reactor at 5-min., 30-min., and 60-min. intervals for GPC and GC analyses. The results can be summarized as follows:

TABLE V

| POLYMER CONVERSION RATES | | | | |
|---|---|---|---|---|
| Reaction Time, | | % Conversion of Monomer to Polymer, based upon: | | |
| Minutes | $M_w$ | Styrene | 2-HEMA | CAP |
| 5 | 5140 | 86 | 92 | 52 |
| 30 | 5600 | 95 | 98 | 79 |
| 60 | 5710 | 97 | 99 | 93 |

Upon completion of the reaction, the polymer product was allowed to cool to room temperature. GPC analysis indicated the following: $M_n=1930$, $M_w=5710$, $M_z=14000$, $M_w/M_n=2.96$, and $M_z/M_n=7.25$.

The viscosity of the polymer product, at room temperature, was found to be 23500 cPs., as determined by Brookfield viscometer. The percent-solids wt.-% of the polyol polymer, based upon the total weight of the polymer-containing solution was 80%. Successive dilutions of the polymer solution, made using PM acetate solvent, produced the following percent solids-viscosity profile:

TABLE VI

| VISCOSITY PROFILE | |
|---|---|
| Solids Polymer | Brookfield Viscosity (cPs.) |
| 80 | 23500 |
| 75 | 4120 |
| 70 | 2620 |
| 65 | 1420 |

The Tg value of the polyol polymer, after separation from the solvent, was found to be $-8°$ C., as determined by DSC.

EXAMPLE 4

STILL ANOTHER METHOD OF MAKING THE POLYMER

A procedure similar to that of EXAMPLE 1 was used to prepare EXAMPLE 4, except that the reaction was performed at 265° C. for 1.5 hours. During the course of the polymerization reaction, samples were periodically removed from the reactor for GPC and GC analyses, the results of which can be summarized as follows:

TABLE VII

| POLYMER CONVERSION RATES | | | | |
|---|---|---|---|---|
| Reaction Time, | | % Conversion of Monomer to Polymer, based upon: | | |
| Minutes | $M_w$ | Styrene | 2-HEMA | CAP |
| 5 | 3710 | 85 | 91 | 54 |
| 30 | 3880 | 95 | 98 | 65 |
| 45 | 4020 | 97 | 99 | 90 |
| 60 | 3990 | 97 | 99 | 94 |
| 90 | 4060 | 98 | 99 | 96 |

Upon completion of the polymerization reaction, the polyol polymer product was allowed to cool to room temperature. GPC analysis indicated the following: $M_n=1460$, $M_w=4060$, $M_z=19900$, $M_w/M_n=2.78$, and $M_z/M_n=13.63$. The viscosity of the polymer product at room temperature was found to be 590 cPs., as determined by Brookfield viscometer. The percent-solids wt.-% of the polyol polymer, based upon the total weight of the polymer-containing solution, was 72%. Successive dilutions of the polymer solution, made using PM acetate solvent, produced the following percent solids-viscosity profile:

TABLE VIII

VISCOSITY PROFILE

| % Solids Polymer | Brookfield Viscosity (cPs.) |
|---|---|
| 72 | 11080 |
| 70 | 783 |
| 65 | 577 |
| 60 | 353 |

The Tg of the polyol polymer, after separation from the solvent, was found to be $-17°$ C., as determined by DSC.

EXAMPLE 5

Yet Another Method of Making the Polymer

A procedure similar to that of EXAMPLE 1 was used to prepare EXAMPLE 5, except that the reaction was performed at 280° C. for 1 hour. During the course of the polymerization reaction, samples were removed periodically from the reactor, for GPC and GC analyses, the results of which can be summarized as follows:

TABLE IX

POLYMER CONVERSION RATES

| Reaction Time, Minutes | $M_w$ | % Conversion of Monomer to Polymer, based upon: | | |
|---|---|---|---|---|
| | | Styrene | 2-HEMA | CAP |
| 30 | 2070 | 97 | 98 | 94 |
| 45 | 2180 | 97 | 98 | 95 |
| 60 | 2250 | 98 | 99 | 96 |

Upon completion of the polymerization reaction, the polyol polymer product was allowed to cool to room temperature. GPC analysis indicated the following: $M_n=870$, $M_w=2250$, $M_z=25080$, $M_w/M_n=2.58$, and $M_z/M_n=28.8$.

The viscosity of the polymer product at room temperature was found to be 590 cPs., as determined by Brookfield viscometer. The percent-solids wt.-% of the polyol polymer, based upon the total weight of the polymer-containing solution, was 74%. Successive dilutions of the polymer solution, made using PM acetate solvent, produced the following percent solids-viscosity profile:

TABLE X

VISCOSITY PROFILE

| % Solids Polymer | Brookfield Viscosity (cPs.) |
|---|---|
| 74 | 590 |
| 70 | 320 |
| 65 | 227 |
| 60 | 146 |

The Tg value of the polyol polymer, after separation from the solvent, was found to be $-34°$ C., as determined by DSC.

EXAMPLE 6

Still Another Method of Making the Polymer

A procedure similar to that of EXAMPLE 1 was used to prepare EXAMPLE 6, except that the reaction was performed at 200° C. for 6.5 hours.

During the course of the polymerization reaction, samples were removed periodically from the reactor, for GPC and GC analyses, the results of which can be summarized as follows:

TABLE XI

POLYMER CONVERSION RATES

| Reaction Time, Minutes | $M_w$ | % Conversion of Monomer to Polymer, based upon: | | |
|---|---|---|---|---|
| | | Styrene | 2-HEMA | CAP |
| 60 | 17,500 | 92 | 97 | 27 |
| 180 | 19,000 | 98 | 100 | 79 |
| 240 | 20,000 | 99 | 100 | 89 |
| 300 | 20,400 | 99 | 100 | 93 |
| 360 | 21,000 | 99 | 100 | 96 |

Upon completion of the polymerization reaction, the polyol polymer product was allowed to cool to room temperature. GPC analysis indicated the following: $M_n=4170$, $M_w=21000$, $M_z=43000$, $M_w/M_n=5.05$, and $M_z/M_n=10.3$.

The viscosity of the polymer product at room temperature was found to be greater than 2,000 Poise, as determined by Brookfield viscometer. The percent-solids wt.-% of the polyol polymer, based upon the total weight of the polymer-containing solution, was found to be 75%. Successive dilutions of the polymer solution, made using PM acetate solvent, produced the following percent solids-viscosity profile:

TABLE XII

VISCOSITY PROFILE

| % Solids Polymer | Brookfield Viscosity |
|---|---|
| 75 | >2000 Poise |
| 70 | 357 Poise |
| 65 | 20000 cPs. |
| 60 | 8680 cPs. |

The Tg value of the polyol polymer, after separation from the solvent, was found to be 13° C., as determined by DSC.

EXAMPLE 7

Yet Another Method of Making the Polymer

A procedure similar to that of EXAMPLE 1 was used to prepare EXAMPLE 7, except that the monomer mixture comprised 350 grams of styrene, 87.5 grams of 2-HEMA and 76.7 grams of caprolactone (CAP). Also, the polymerization reaction was run for 3.5 hours instead of 4 hours. During the course of the polymerization reaction, samples were periodically removed from the reactor for GPC and GC analyses, the results of which can be summarized as follows:

TABLE XIII

POLYMER CONVERSION RATES

| Reaction Time, Minutes | $M_w$ | % Conversion of Monomer to Polymer, based upon: | | |
|---|---|---|---|---|
| | | Styrene | 2-HEMA | CAP |
| 60 | 10500 | 90 | 98 | 46 |
| 120 | 10900 | 98 | 100 | 63 |
| 180 | 11300 | 99 | 100 | 78 |
| 210 | 11600 | 99 | 100 | 86 |

Upon completion of the polymerization reaction, the polyol polymer product was allowed to cool to room temperature. GPC analysis indicated the following: $M_n=3140$, $M_w=11600$, $M_z=23800$, $M_w/M_n=3.67$, and $M_z/M_n=7.57$.

The viscosity of the polymer product material at room temperature was found to be greater than about 2000 Poise, as determined by Brookfield viscometer. The percent-solids wt.-% of the polyol polymer, based upon the total weight of the polymer-containing solution, was found to be 82%. Successive dilutions of the polymer solution, made using PM acetate solvent, produced the following percent solids-viscosity profile:

TABLE XIV

VISCOSITY PROFILE

| % Solids Polymer | Brookfield Viscosity |
| --- | --- |
| 82 | >2000 Poise |
| 70 | 48400 cPs. |
| 65 | 38500 cPs. |
| 60 | 13300 cPs. |

The Tg value of the polyol polymer, after separation from the solvent, was found to be 12° C., as determined by DSC.

EXAMPLE 8

Still Another Method of Making the Polymer

A procedure similar to that of EXAMPLE 1 was used to prepare EXAMPLE 8, except that the monomer mixture was composed of 350 grams of styrene, 87.5 grams of 2-HEMA and 230.2 grams of CAP. Also, the polymerization reaction was run for 5.5 hours instead of 4 hours. During the course of the reaction, samples were periodically removed from the reactor for GPC and GC analyses, the results of which can be summarized as follows:

TABLE XV

POLYMER CONVERSION RATES

| Reaction Time, Minutes | $M_w$ | % Conversion of Monomer to Polymer, based upon: | | |
| --- | --- | --- | --- | --- |
| | | Styrene | 2-HEMA | CAP |
| 60 | 6650 | 95 | 99 | 63 |
| 120 | 7549 | 98 | 99 | 89 |
| 180 | 7970 | 98 | 99 | 94 |
| 240 | 8280 | 99 | 99 | 96 |
| 300 | 8370 | 99 | 99 | 97 |
| 330 | 8480 | 99 | 99 | 97 |

Upon completion of the polymerization reaction, the polyol polymer product was allowed to cool to room temperature. GPC analysis indicated the following: $M_n=1990$, $M_w=8480$, $M_z=22500$, $M_w/M_n=4.25$, and $M_z/M_n=11.3$.

The viscosity of the polymer product at room temperature was found to be about 4030 cPs., as determined by Brookfield viscometer. The percent-solids wt.-% of the polyol polymer, based upon the total weight of the polymer-containing solution, was found to be 74%. Successive dilutions of the polymer solution, made using PM acetate solvent, produced the following percent solids-viscosity profile:

TABLE XVI

VISCOSITY PROFILE

| % Solids Polymer | Brookfield Viscosity (cPs.) |
| --- | --- |
| 74 | 4030 |
| 70 | 2230 |
| 65 | 1025 |
| 60 | 570 |

The Tg value of the polyol polymer, after separation from the solvent, was found to be −36° C., as determined by DSC.

EXAMPLE 9

One Method of Curing the Polymer, Including the Physical Properties of the Polymer So Cured 25 grams of the polyol polymer, produced in accordance with EXAMPLE 1, was formulated into a thermosetting coating as follows.

4.38 grams of melamine (an amino resin) was added to the polymer-containing solution, together with about 0.146 grams of para-toluenesulfonic acid. (The melamine functions as a polymer-curing ingredient, and the acid functions as a catalyst.) After mixing for 120 minutes, the polymer mixture was applied to a cold-rolled steel substrate, and then baked at a temperature of 150° C. for 25 minutes. During this baking step, substantially all of the solvent present in the thus-curing polymer was driven off, thereby forming a coating having a thickness of about 2 mils. Such coating exhibited a reverse-impact resistance of 104 in.-lbs., a direct-impact resistance of 116 in.-lbs., a so-called "Konig" hardness of 146, and a so-called "pencil" hardness of 2H. [See, e.g., ASTM Testing Procedure Nos. D 2794-84 and D 3363-74.]

EXAMPLE 10

The Physical Properties of Another Polymer so Cured 25 grams of the polyol polymer, produced in accordance with EXAMPLE 2, was formulated into a thermoset coating, in accordance with procedures set forth in EXAMPLE 9. The final, melamine-cured coating exhibited a reverse-impact resistance of 116 in.-lbs., a direct-impact resistance of 120 in.-lbs., a "Konig" hardness of 97, and a "pencil" hardness of H.

EXAMPLE 12

The Physical Properties of Yet Another Polymer so Cured 25 grams of the polyol polymer, produced in accordance with EXAMPLE 3, was formulated into a thermoset coating, in accordance with procedures set forth in EXAMPLE 9. The final, melamine-cured coating exhibited a reverse-impact resistance of 108 in.-lbs., a direct-impact resistance of 120 in.-lbs., a "Konig" hardness of 114, and a "pencil" hardness of H.

EXAMPLE 12

The Physical Properties of Still Another Polymer so Cured 25 grams of the polyol polymer, produced in accordance with EXAMPLE 4, was formulated into a thermoset coating, in accordance with procedures set forth in EXAMPLE 9. The final, melamine-cured coating exhibited a reverse-impact resistance of 132 in.-lbs., a direct-impact resistance of 136 in.-lbs., a "Konig" hardness of 52, and a "pencil" hardness of HB-F.

EXAMPLE 13

The Physical Properties of Still Yet Another Polymer so Cured 25 grams of the polyol polymer, produced in accordance with EXAMPLE 5, was formulated into a thermoset coating, in accordance with procedures set forth in EXAMPLE 9. The final, melamine-cured coating exhibited a reverse-impact resistance of 100 in.-lbs., a direct-impact resistance of less than 36 in.-lbs., a "Konig" hardness of 11, and a "pencil" hardness of 4B.

EXAMPLE 14

The Physical Properties of Yet Another Polymer so Cured 25 grams of the polyol polymer, produced in accordance with EXAMPLE 6, was formulated into a thermoset coating, in accordance with procedures set forth in EXAMPLE 9. The final, melamine-cured coating exhibited a reverse-impact resistance of 96 in.-lbs., a direct-impact resistance of 112 in.-lbs., a "Konig" hardness of 148, and a "pencil" hardness of 2H.

EXAMPLE 15

The Physical Properties of Still Another Polymer so Cured 25 grams of the polyol polymer, produced in accordance with EXAMPLE 7, was formulated into a thermoset coating, in accordance with procedures set forth in EXAMPLE 9. The final, melamine-cured coating exhibited a reverse-impact resistance of 16 in.-lbs., a direct-impact resistance of 36 in.-lbs., a "Konig" hardness of 155, and a "pencil" hardness of 2H.

EXAMPLE 16

The Physical Properties of Yet Another Polymer so Cured 25 grams of the polyol polymer, produced in accordance with EXAMPLE 8, was formulated into a thermoset coating, in accordance with procedures set forth in EXAMPLE 9. The final, melamine-cured coating exhibited a reverse-impact resistance of 144 in.-lbs., a direct-impact resistance of 88 in.-lbs., a "Konig" hardness of 22, and a "pencil" hardness of B.

EXAMPLE 17

Another Method of Curing the Polymer

Another batch of polyol polymer was produced in accordance with the procedures of EXAMPLE 1, except that, before the polyol polymer was separated from the solvent, 6.1 grams of isocyanate (a polymer-curing ingredient) was added to 20 grams of the polymer-containing solution. After about 120 minutes of mixing, the polymer mixture was applied to another cold-rolled steel substrate and then baked at 150° C. for about 35 minutes. During this baking step, substantially all of the solvent present on the thus-curing polymer was driven off, thereby forming a coating having a thickness of about 2 mils. Such a coating exhibited a reverse-impact resistance of 160 in.-lbs., a direct-impact resistance of 160 in.-lbs., a "Konig" hardness of 124, and a "pencil" hardness of H-2H.

EXAMPLE 18

The Physical Properties of Yet Another Isocyanate-Cured Polymer 20 grams of the polyol polymer, described in EXAMPLE 3, was formulated into a thermoset coating and cured on steel panels, utilizing the procedure described in EXAMPLE 17. The final isocyanate-cured coating exhibited a reverse-impact resistance of greater than 160 in.-lbs., a direct-impact resistance of greater than 160 in.-lbs., a "Konig" hardness of 88, and a "pencil" hardness of B.

EXAMPLE 19

The Physical Properties of Still Another Isocyanate-Cured Polymer 20 grams of the polyol polymer, described in EXAMPLE 6, was formulated into a thermoset coating and cured on steel panels, utilizing the procedure described in EXAMPLE 17. The final, isocyanate-cured coating exhibited a reverse-impact resistance of greater than 160 in.-lbs., a direct-impact resistance of greater than 160 in.-lbs., a "Konig" hardness of 120, and a "pencil" hardness of 2H.

EXAMPLE 20

The Physical Properties of Yet Another Isocyanate-Cured Polymer 20 grams of the polyol polymer, described in EXAMPLE 7, was formulated into a thermoset coating and cured on steel panels, utilizing the procedure described in EXAMPLE 17. The final, isocyanate-cured coating exhibited a reverse-impact resistance of greater than 160 in.-lbs., a direct-impact resistance of greater than 160 in.-lbs., a "Konig" hardness of 140, and a "pencil" hardness of H.

In order to further distinguish polyol polymers produced by our SGA polymerization process from polyol polymers produced by prior-art processes, uncured polyol polymer, made in accordance with EXAMPLES 1 and 3 of U.S. Pat. No. 3,892,714 to Sampson et al., together with uncured polyol polymer, made in accordance with EXAMPLES 1 and 3-5 of U.S. Pat. No. 4,005,155, also to Sampson et al., were respectively made, and the physical properties were thereafter compared to uncured polyol polymer which was made in accordance with EXAMPLES 1-8 of our present patent application. The results of the comparison are presented and summarized below.

EXAMPLE 21

A Comparison of Uncured Polyol Polymers

A batch of polyol polymer was prepared, in accordance with the procedures set forth in EXAMPLES 1 and 3 of U.S. Pat. No. 4,005,155, for the purpose of comparing the prior-art polyol to polyol polymer produced by the method of our present invention. Upon completion of the polymerization reaction described in U.S. Pat. No. 4,005,155, the prior-art polyol polymer produced as a result was found to possess the following physical properties: $M_n = 14370$, $M_w = 199360$, $M_z = 493490$, $M_w/M_n = 13.86$, and $M_z/M_n = 34.33$.

To compare the percent solids-viscosity value of this prior-art polyol polymer to that of EXAMPLES 1 through 8 of this disclosure, solvent was removed from the solution containing the prior-art polyol polymer, by placing the polymer-containing solution in a vacuum oven at 25° C. The prior-art polyol polymer was then recovered, the percent-solid wt.-% of the prior-art polyol polymer determined gravimetrically, and its viscosity determined via a Brookfield viscometer. The prior-art polyol exhibited the following percent solids-viscosity value:

TABLE XVII

| PRIOR-ART POLYOL POLYMER VISCOSITY | |
|---|---|
| % Solids Polymer | Brookfield Viscosity (cPs.) |
| 64 | 81,000,000 |

EXAMPLE 22

Physical Properties of Yet Another Prior-Art, Uncured Polyol Polymer

A batch of polyol polymer was prepared, in accordance with the procedures set forth in EXAMPLE 4 of U.S. Pat. No. 4,005,155. Upon completion of the polymerization reaction, the prior-art polyol polymer was found to possess the following physical properties: $M_n=14180$, $M_w=244010$, $M_z=763500$, $M_w/M_n=17.21$, and $M_z/M_n=53.85$. A percent solids-viscosity value was arrived at utilizing the method described in EXAMPLE 21. The prior-art polyol exhibited the following percent solids-viscosity value:

TABLE XVIII

| PRIOR-ART POLYOL POLYMER VISCOSITY | |
|---|---|
| % Solids Polymer | Brookfield Viscosity (cPs.) |
| 70 | 324,000,000 |

EXAMPLE 23

Physical Properties of Still Another Prior-Art, Uncured Polyol Polymer

A batch of polyol polymer was prepared in accordance with the procedures set forth in EXAMPLE 5 of U.S. Pat. No. 4,005,155. Upon completion of the polymerization reaction, the prior-art polyol polymer was found to possess the following physical properties: $M_n=10620$, $M_w=509,410$, $M_z=23,910,900$, $M_w/M_n=47.95$, and $M_z/M_n=2251.5$. A percent solids-viscosity value was arrived at utilizing the method described in EXAMPLE 21. This prior-art polyol exhibited the following percent solids-viscosity value:

TABLE XIX

| PRIOR-ART POLYOL POLYMER VISCOSITY | |
|---|---|
| % Solids Polymer | Brookfield Viscosity (cPs.) |
| 50 | >324,000,000 |

EXAMPLE 24

Physical Properties of Yet Another Prior-Art, Uncured Polyol Polymer

A batch of polyol polymer was prepared, in accordance with the procedures set forth in EXAMPLES 1 and 3 of U.S. Pat. No. 3,892,714, for the purpose of further comparing yet another prior-art polyol to polyol polymer produced by the method of the present invention. Upon completion of the polymerization reaction, the prior-art polyol polymer produced as a result was found to possess the following physical properties: $M_n=12000$, $M_w=80000$, $M_z=163000$, $M_w/M_n=6.7$, and $M_z/M_n=13.7$. A percent solids-viscosity value was arrived at utilizing the method described in EXAMPLE 21. The prior-art polyol exhibited the following percent solids-viscosity value:

TABLE XX

| PRIOR-ART POLYOL POLYMER VISCOSITY | |
|---|---|
| % Solids Polymer | Brookfield Viscosity (cPs.) |
| 50 | 57,000,000 |

DETAILED DESCRIPTION OF THE ILLUSTRATED EMBODIMENT

The accompanying illustrated embodiment, which discloses a number of aspects and features of our present invention, depicts a continuous process as well as an apparatus for producing a polyol polymer. Our process for producing the polyol polymer expressly excludes utilization of a catalyst for the carbonyl carbon-containing ringed molecule. The polyol polymer consists of at least one polymeric main chain and a plurality of pendant, polymeric side chains. Yet another aspect of our invention is generally directed to such a process for producing the polyol polymer, whereby simultaneous grafting and addition polymerization-reaction mechanisms respectively cause the side chains and the main chain of the polyol polymer to form.

INDUSTRIAL APPLICABILITY

Referring now to the accompanying FIGURE, there is shown a hold tank 100 adapted to contain a pumpable fluid and equipped with an impeller 102 and a motor 104 for driving the impeller 102. Solvent, if used, is passed from a source 106 via a conduit 108 into the hold tank 100. Preselected monomers from a number of additional sources 109, 110, 111 and 112 are separately passed via a conduit 114 into the hold tank 100. Initiator, if used in the production of the polyol polymer, is passed from a source 116 via a conduit 117 into the hold tank 100.

In particular, various monomers from sources 109–112, solvent, if used, from source 106 and initiator, if utilized, from source 116 are charged to hold tank 100 at ambient conditions. No special addition order or hold time is required. The contents of hold tank 100 are then agitated to uniformity, prior to and during use.

The solvent (if used), the preselected monomers, and the initiator (if used) in hold tank 100 are hereinafter simply referred to as "the reactor feed ingredients", unless otherwise indicated.

In the accompanying FIGURE there is also shown a reactor 118 which receives the reactor feed ingredients along with a predetermined amount of recycled ingredients (which will be described in greater detail further below) via feed pipe 120. The reactor 118 is equipped with an impeller 122 and a motor 124 for driving the reactor impeller 122.

The process of the present invention involves the use, preferably, of a so-called "variable-fillage" type stirred reactor for the polymerization of preselected monomers discussed hereinabove to copolymers having a desired, narrow molecular weight distribution by the proper balancing of the conditions of polymerization and flow rates. The "reaction zone" can comprise a continuous stirred tank reactor ("CSTR") of any type adapted for variable fillage operation of from as low as 10% to 100% of the usable volume thereof for the production of the polyol polymers. Such a continuous stirred tank reactor may be either horizontal or vertical and should have provision for close control of the temperature therein by any desired means, including control by a cooling jacket, internal cooling coils or by withdrawal of vaporized monomer followed by condensation thereof and return of the condensed monomer to the reaction zone. It will be apparent to those skilled in the art that such a reaction zone can, if desired, be constituted by a plurality of continuous stirred tank reactors operated in series. Likewise, it will be apparent that such a reaction zone can comprise more than one continuous stirred tank reactor operated in parallel, if it is desired to employ several relatively small rectors to supply the capacity of the final reaction zone rather than a single large reactor for that purpose.

It is, accordingly, well within the scope of our invention to modify an extruder or a so-called "back-mix" reactor to permit our process to be conducted therein, as can be appreciated by those skilled in the art.

A preferred form of continuous stirred reactor which has been found quite suitable for carrying out the process of our invention is a tank reactor provided with cooling coils sufficient to remove any heat of polymerization not taken up by raising the temperature of the continuously charged monomer composition so as to maintain a preselected temperature for polymerization therein. Preferably such a continuously stirred tank reactor will be provided with at least one and usually more, vaned agitators driven by an external power source, such as a motor, as was briefly mentioned above. At least one such agitator is so positioned as to provide agitation of liquid contained in the reactor while operating at minimum fillage, i.e., as low as 10% of the volume thereof. Such a continuous stirred tank reactor can, if desired, be provided with additional features for improved efficiency of operation and safety, such as an additional series of internal cooling coils adapted to effectively prevent any "run-away" polymerization if the normal holding period has to be extended for some reason. The continuous stirred tank reactor can further, if desired, be provided with an outer jacket for additional cooling or heating of the contents of the reactor.

In operating the present continuous polymerization process, flexibility and range of choice can be realized in the various different polyol polymers produced, as well as in the production rate thereof, by suitable choice of polymerization reaction conditions. In operation, the reactor feed ingredients are charged to the reactor and the temperature of the feed is raised to from about 180° C. to 270° C. to induce polymerization in the reactor. Pressure in the reactor can vary from about 30 to 40 psia to about 400 psia or even higher.

After the initial fillage of the reactor to the desired preselected level and after polymerizing the charged monomer to approximately the desired solids content, the volume of monomer composition charged thereto is adjusted to such a value as to maintain a preselected level of liquid in the reactor. Thereafter, the liquid mixture of polymer and monomer is withdrawn from the reactor, to maintain the preselected level of such liquid mixture in the reaction zone. Polymerization conditions are continuously maintained in the reactor in a manner so as to produce a polymer of preselected molecular weight and preselected degree of conversion, of desired weight percent solids of polymer in such liquid mixture. The reaction zone can thus be operated in a manner so as to produce a liquid mixture with a polymer concentration or percent solids from as low as about 50 percent to as high as 99 percent by weight. The level of fillage of the reactor can vary from as low as 10 percent to as high as 100 percent of usable volume and may be controlled by any desired means, for example, a level controller and associated valve or pump in the transfer line from the reactor.

Any desired means of controlling the temperature within the reactor may be employed. It is preferred that the temperature can be controlled by circulation of a cooling fluid, such as oil, through internal cooling coils in those reactors so equipped. The entry of relatively cool monomer composition serves to remove the greater proportion of the heat of polymerization released and the internal cooling coils serve to remove the remainder so as to control the temperature of the liquid mixture therein to a preselected value and thus produce a polymer of the desired degree of conversion and average molecular weight and distribution.

As the polymer concentration increases, the possibility of damage from "run-away" reactions is substantially reduced. In general it is preferred to produce in the reaction zone a solids content of from 80 to 99% by weight of the polymer of Mn from about 700 to about 15,000, more preferably of about 1,000 to about 10,000, still more preferably of about 1,000 to about 7,000, and most preferably of about 1,000 to 3,000, and of relatively narrow molecular weight distribution. The residence time in the reaction zone preferably varies from about 2 to 120 minutes.

In addition to the above-discussed so-called "single pass" mode, reactor 118 can include a recycle stream (not shown) if desired, as will be appreciated by those skilled in the art.

The reactor-contained ingredients are hereinafter simply referred to as "the reaction mixture"

After being held in reactor 118 for a predetermined period of time at the desired reaction temperature and at the preselected superatmospheric pressure, a portion of the reaction mixture, which now contains a quantity of the desired polyol polymer, is withdrawn from reactor 118 by pump 126 and is pumped by pump 126 preferably into a thin-film evaporator 128 via a conduit 130. A vacuum source 132, which communicates with the thin-film evaporator 128 via a vacuum line 134, is utilized to maintain the contents of the evaporator 128 at a pressure which is slightly less than 14.7 psia.

In operation, the thin-film evaporator 128 separates the polyol product from unreacted monomer and other volatile materials which have been transferred from reactor 118 via conduit 130. Such volatile materials, in addition to the above-mentioned unreacted monomer, include water, certain monomer-soluble impurities such as cumene and butyl benzene, certain oligomers, certain reaction by-products, solvent if used, and, if initiator is used, certain initiator fragments. The thin-film evaporator 128 thus separates into two phases the polyol polymer-containing reaction mixture that is being withdrawn from reactor 118. The two phases include a liquid phase which contains the polyol polymer and a vapor phase which contains unreacted monomer and the other above-mentioned volatile materials.

While the contents of the thin-film evaporator 128 need not be heated, such contents are heated generally to between about 250 to 600 degrees Fahrenheit ("°F."), preferably to between about 300° to 550° F., and more preferably to between about 350° to 500° F.

The contents of the evaporator 128, moreover, are preferably maintained at a pressure which is relatively slightly less than that pressure which is external to the evaporator 128. (External to the thin-film evaporator 128, the pressure is about 1 atmosphere.)

The polyol polymer-enriched liquid phase is withdrawn from the thin-film evaporator 128 by a pump 136, and is pumped by pump 136 via a conduit 138 to a product-storage site 140 for storage, or further processing, as desired. The vapor phase is passed from the thin-film evaporator 128 to a condenser or heat exchanger 142 via a conduit 144. Heat exchanger 142 is of the so-called "shell-and-tube" type, with the process fluid being on the tube side. Alternative construction may be used. For example, a partial-condensation system that utilizes two or more heat exchangers could readily be so arranged by those skilled in the art as to be suitable for purposes of the present invention.

A heat-exchange fluid from a source 146 is passed via a conduit 148 to the condenser 142. Within condenser 142, enough heat is transferred from the vapor phase to the heat-exchange fluid so that a portion of the condenser-contained vapor phase condenses. The now-heated heat-exchange fluid is transferred via a conduit 172 to a heat-exchange fluid-collection site 174 for storage or for processing, as desired. While the preferred heat-exchange fluid is water, a variety of commercially-available, suitable heat-exchange fluids such as glycol are well known to those skilled in the art.

The resultant condensate includes unreacted monomer, water, certain monomer-soluble impurities such as cumene and butyl benzene, certain oligomers, certain reaction by-products, solvent if used, and, if initiator is used, certain initiator fragments. Such condensate is passed from condenser 142 via a conduit 150 into a receiver or purge vessel 152. A minor portion of the condensate thus passed into receiver 152 is transferred via a conduit 168 to a purge-collection site 170 for storage or further processing, as desired. The remainder of the thus-collected condensate (i.e., a major portion of the thus-collected condensate) is returned to reactor 118, as follows.

A major portion of the condensate thus passed into receive 152 is transferred by a pump 154 and via a conduit 156 into a surge tank 158. Such condensate is removed from the surge tank 158 by a pump 160, and is recycled by pump 160 and via a conduit 162 into the reactor 118 (by way of feed pipe 120).

The above-mentioned reactor feed ingredients are controllably withdrawn from hold tank 100 by a pump 164, which controllably pumps such reactor-feed ingredients via a conduit 166 into the reactor 118 by way of feed pipe 120.

Reactor 118 is a pressurizable vessel. While such a pressurable vessel can be operated at a predetermined liquid level, utilizing e.g. commercially-available level-control equipment and inert gas in the head space, we prefer to operate reactor 118 in a so-called "liquid-full" manner whereby the reaction mixture entirely fills reactor 118. For this purpose, and because reactor 118 is pressurized, reactor 118 further includes a pressurizable upper seal 176, which is pressurized by an external pressure source 178 via a conduit 180. Seal oil, for the upper seal 176, is so chosen as to be compatible with the polyol polymer being produced.

The hold (or "residence") time of the reaction mixture in reactor 118 is controlled by the pumping rates of pumps 160 and 164. As was briefly mentioned above, a major portion of those process vapors that are condensed by condenser 142, hereinafter referred to as "reactor recycle ingredients", are transferred into surge tank 158. Pump 164 which is used to withdraw the reactor feed ingredients from hold tank 100 and pump 160 which is used to withdraw reactor recycle ingredients from surge tank 158 are, in particular, both so controllably operated as to hold the reaction mixture in reactor 118 for a predetermined, desired amount of time.

Such reactor hold time, herein referred to as the "reactor residence time", is generally about 2 to about 120 minutes, preferably about 2 to about 60 minutes, and more preferably about 15 to about 45 minutes, for those polyol polymers that we have produced and which we discuss further hereinbelow.

As can be appreciated, for the production of other polyol polymers, the percent conversion per pass through the reactor and the overall conversion, including recycle, will undoubtedly require different reactor residence time ranges, as can be appreciated by those skilled in the art.

The following Examples, namely Examples 25-33, were prepared utilizing the process shown in the accompanying FIGURE. In Examples 25-33, and unless otherwise noted, the term "parts" will be used to mean "parts-by-weight".

The polyol polymers of Examples 25-27 were prepared in reactor 118 without solvent and without initiator. The reaction mixture in reactor 118 included 59 parts styrene, 15 parts 2-hydroxyethyl methacrylate ("2-HEMA"), and 26 parts epsilon-caprolactone ("CAP").

Examples 25 and 27 demonstrate how selection of a particular reaction temperature, within reactor 118, can be utilized to control the molecular weight of a particular polyol polymer.

Example 26 demonstrates how selection of a particular residence time for the reaction mixture in reactor 118 can be utilized to control the molecular weight of a particular polyol polymer.

The polyol polymers of Examples 28-33 were prepared in reactor 118 without solvent but with initiator. The initiator thus utilized, in varying amount, was di-tertiary butyl peroxide ("DTBP").

In Example 28, the reaction mixture in reactor 118 included 39.5 parts alpha-methyl styrene ("AMS"), 30 parts 2-hydroxyethyl methacrylate ("2-HEMA"), 30 parts epsilon-caprolactone ("CAP"), and 0.5 parts di-tertiary butyl peroxide ("DTBP") initiator.

In Example 29, the reaction mixture in reactor 118 included 13.99 parts styrene, 27.98 parts methyl methacrylate ("MMA"), 7.69 parts butyl acrylate ("BA"), 20.28 parts 2-hydroxyethyl acrylate ("2-HEA"), 29 parts CAP, and 0.15 parts DTBP.

In Example 30, the reaction mixture in reactor 118 included 12.72 parts styrene, 25.44 parts MMA, 7.00 parts BA, 18.44 parts 2-HEA, 36.29 parts CAP, and 0.14 parts DTBP.

Examples 29 and 30 demonstrate how selection of a particular reaction temperature, within reactor 118, can be utilized to control the molecular weight of a particular polyol.

In Example 31, the reaction mixture in reactor 118 included 58.6 parts styrene, 14.9 parts 2-HEMA, 25.75 parts CAP, 0.5 parts acetic acid, and 0.25 parts DTBP.

In Example 33, The reaction mixture in rector 118 included 57.8 parts styrene, 14.7 parts 2-HEMA, 25.5 parts CAP, 0.5 parts acetic acid, and 1.00 part DTBP.

Certain physical properties of these polyol polymers, Examples 25-33, made in accordance with the principles of our continuous process depicted in the accompanying FIGURE, are summarized in Table XXI below.

TABLE XXI

POLYOL POLYMERS MADE VIA CONTINUOUS PROCESS

| Ex. No. | Reactor React. Temp., °F. | Reactor Res. Time, Min. | Monomer Tg, °C. | Monomer OH No.* | Polyol Polymer Mn | Polyol Polymer Mw | Polyol Polymer Mz | Polyol Polymer Mw/Mn |
|---|---|---|---|---|---|---|---|---|
| 25 | 488 | 30 | 8 | 74.1 | 2730 | 7,870 | 18,240 | 2.88 |
| 25 | 466 | 30 | 7 | 76.5 | 3950 | 13,710 | 35,200 | 3.47 |
| 25 | 444 | 30 | 9 | 91.5 | 5170 | 17,640 | 38,780 | 3.41 |
| 26 | 485 | 60 | −8 | 71.6 | 2210 | 6,540 | 23,260 | 2.96 |
| 26 | 484 | 30 | 0 | 78.9 | 2680 | 7,100 | 14,580 | 2.65 |
| 26 | 485 | 15 | 36 | 90.4 | 3470 | 9,720 | 18,380 | 2.80 |
| 27 | 520 | 30 | −12 | 80.1 | 1750 | 5,080 | 20,510 | 2.90 |
| 27 | 480 | 30 | 0 | 83.1 | 2900 | 9,720 | 27,080 | 3.35 |
| 27 | 441 | 30 | 9 | 89.0 | 4720 | 21,860 | 62,690 | 4.63 |
| 28 | 450 | 20 | — | 277.9 | 460 | 590 | 860 | 1.28 |
| 28 | 425 | 20 | — | 304 | 450 | 570 | 880 | 1.27 |
| 29 | 470 | 15 | −40 | 117.7 | 1590 | 3,940 | 19,810 | 2.48 |
| 29 | 430 | 15 | −30 | 112.8 | 2320 | 5,490 | 11,060 | 2.37 |
| 29 | 390 | 15 | −10 | 122.3 | 3810 | 11,270 | 23,980 | 2.96 |
| 30 | 470 | 15 | −41 | 118.2 | 1530 | 3,510 | 11,220 | 2.29 |
| 30 | 430 | 15 | −35 | 110.3 | 2200 | 4,810 | 9,020 | 2.19 |
| 30 | 390 | 15 | −30 | 120.2 | 3570 | 9,630 | 19,380 | 2.70 |
| 31 | 464 | 30 | −3 | 66.1 | 2110 | 5,720 | 11,550 | 2.70 |
| 32 | 464 | 30 | −4 | 71.8 | 1620 | 4,220 | 9,560 | 2.59 |
| 33 | 464 | 30 | −7 | 66.6 | 1430 | 3,470 | 8,040 | 2.43 |

*The hydroxyl number is on a 100% solids basis.

In Examples 25–33, the percent conversion of total monomer to polymer is summarized in Table XXII below. The single-pass percent conversion is based upon weight of polymer produced, divided by total weight of all monomer.

TABLE XXII

MONOMERIC CONVERSIONS

| Example Number | Reactor React. Temp., °F. | Reactor Res. Time, Min. | % Conversion of Monomer Single Pass | % Conversion of Monomer With Recycle |
|---|---|---|---|---|
| 25 | 488 | 30 | 83.6 | 98+ |
| 25 | 466 | 30 | 79.6 | 98+ |
| 25 | 444 | 30 | 63.5 | 98+ |
| 26 | 485 | 60 | 88.6 | 98+ |
| 26 | 484 | 30 | 72.7 | 98+ |
| 26 | 485 | 15 | 64.8 | 98+ |
| 27 | 520 | 30 | 87.8 | 98+ |
| 27 | 480 | 30 | 81.7 | 98+ |
| 27 | 441 | 30 | 74.1 | 98+ |
| 28 | 450 | 20 | 10.7 | — |
| 28 | 425 | 20 | 9.2 | — |
| 29 | 470 | 15 | 58.5 | 95+ |
| 29 | 430 | 15 | 71.1 | 95+ |
| 29 | 390 | 15 | 74.4 | 95+ |
| 30 | 470 | 15 | 38.7 | 95+ |
| 30 | 430 | 15 | 66.6 | 95+ |
| 30 | 390 | 15 | 57.1 | 95+ |
| 31 | 464 | 30 | 89.5 | 98+ |
| 32 | 464 | 30 | 89.1 | 98+ |
| 33 | 464 | 30 | 90.5 | 98+ |

The percent conversion of monomer, with recycle, is "estimated" in that it is based upon appearance of flaked product and recycle stream together with experience of the observer.

EXAMPLE 34

One Coating Formulation

A quantity of the polyol polymer of Example 25, produced at 488° F., was formulated into a coating as follows.

A 70 weight percent solids solution of polyol polymer in methyl amyl ketone ("MAK") solvent was prepared. To 25 grams of this solution was added 4.38 grams of a commercially-available melamine resin ("Cymel 303") and 0.146 grams of a commercially-available para-toluene sulfonic acid solution ("K-Cure 1040", which is 40% PTSA in isopropanol). After thorough mixing, the mixture was applied to a cold-rolled steel panel, using a No. 34 wire-wound rod. The panel was then baked at 150° C. for 25 minutes, yielding a coating of approximately 1 mil. in thickness. The impact resistance of the coating was greater than 160 in.-lbs. for both reverse and direct impact, as determined using a falling-ball impact tester. The "pencil" hardness of the thus-produced polymeric film was 2H to 3H. The "Konig" hardness was 141. [See ASTM Procedures D 2794-84 and D 3363-74.]

EXAMPLE 35

Another Coating Formulation

A quantity of the polyol polymer of Example 26, produced at the 60-min. residence time, was formulated into a coating, utilizing the procedures of Example 34. The thus-produced polymeric film had reverse and direct impact resistance values of greater than 160 in.-lbs., a "pencil" hardness of 2H to 3H, and a "Konig" hardness of 145.

What has been described herein is a process as well as an apparatus for producing a novel polyol polymer. Also described herein is the novel polyol polymer so produced. While the process together with the polyol polymer thus produced have been described with reference to a number of preferred embodiments, the present invention is not limited thereto. On the contrary, alternatives, changes and modifications will become apparent to those skilled in the art upon reading the foregoing description. Accordingly, various alternatives, changes and modifications will become apparent to those skilled in the art upon reading this disclosure, and such are to be considered as forming a part of our present invention insofar as they fall within the spirit and scope of the appended claims.

We claim:

1. A continuous polymerization process to produce a graft polymer having at least one main chain and a plurality of side chains attached thereto, the continuous polymerization process comprising the steps of:

combining in a reaction zone an (1) addition-polymerizable monomer that is also a free-radical initiator together with an (2) ethylenically-unsaturated monomer having a nucleophilic or an electrophilic moiety at a reaction temperature that is effective for initiating addition copolymerization of the addition-polymerizable monomer with the ethylenically-unsaturated monomer, wherein propagation by the addition-copolymerization reaction forms the main chain of the graft polymer;

while also combining in the reaction zone a polymerizable, carbonyl carbon-containing ringed molecule at a superatmospheric pressure effective, at the elevated temperature, to cause the ring portion of the ringed molecule to open in the vicinity of the carbonyl carbon thereof in response to the presence of the nucleophilic or the electrophilic moiety of the ethylenically-unsaturated monomer, for initiating ionic-copolymerization of the polymerizable ringed molecule with the nucleophilic-containing or electrophilic-containing moiety of the ethylenically-unsaturated monomer, wherein propagation by the ionic-copolymerization reaction forms the side chains of the graft polymer; and terminating both of the addition-copolymerization and the ionic-copolymerization reactions when the thus-produced graft polymer attains a predetermined number-average and/or weight-average molecule weight, the polymerization process being characterized in that each of the main-chain and side-chain propagations occurs substantially simultaneously, relative to the other, and wherein the polymerization process is further characterized in that the ionic-copolymerization reaction occurs expressly excluding utilization of a catalyst for the carbonyl carbon-containing ringed molecule.

2. The continuous process of claim 1 wherein the reaction temperature is about 100 to about 350 degrees Centigrade, when styrene monomer is the free-radical initiator addition-copolymerizable monomer.

3. The process of claim 2 wherein the temperature is about 150 to about 300 degrees Centigrade.

4. The process of claim 2 wherein the temperature is about 190 to about 270 degrees Centigrade.

5. The continuous process of claim 1 wherein the free-radical initiator addition-polymerizable monomer is selected from the group consisting of styrene, alpha-methyl styrene, ortho-chlorostyrene, tertiary-butyl styrene, and vinyl toluene.

6. The continuous process of claim 1 wherein the superatmospheric pressure is about 30 psia to about 400 psia.

7. The process of claim 6 wherein the pressure is about 40 psia to about 300 psia.

8. The process of claim 6 wherein the pressure is about 60 psia to about 200 psia.

9. The continuous process of claim 1 wherein the polymerizable, carbonyl carbon-containing ringed molecule is selected from the group consisting of beta-propiolactone, alpha,alpha-bis(chloromethyl)propiolactone, beta-butyrolactone, delta-valerolactone, alpha,beta,gamma-trimethoxy-delta-valerolactone, 1,4-dioxane-2-one, glycolide, lactide, 1,4-dithiane-2,5-dione, trimethylene carbonate, neopentyl carbonate, ethylene oxalate, beta-methyl-epsilon-isopropyl-epsilon-caprolactone, propylene oxalate, epsilon-caprolactone, and lactones of 4-hydroxylcyclohexane carboxylic acid, cis-disalicylide, di-o-cresotide, and trisalicylide.

10. The continuous process of claim 1 further including the step of introducing a solvent into the reaction zone, wherein the solvent is selected from the group consisting of butyl acetate, methyl amyl ketone, propylene glycol monomethyl ether acetate, toluene, xylene, dimethyl cellosolve, glyme, diglyme, triglyme, diethyl carbitol, diethyl cellosolve, and cellosolve acetate.

11. The continuous process of claim 10 further comprising the steps of: separating the graft polymer from the solvent; and recovering the graft polymer.

12. The continuous process of claim 1 wherein the combining steps take place utilizing agitation.

13. The continuous process of claim 1 wherein the ethylenically-unsaturated monomer has an hydroxyl moiety and is selected from the group consisting of hydroxyalkyl acrylate, hydroxyalkyl methacrylate, and methyl alpha-hydroxyalkyl acrylate.

14. The continuous process of claim 1 wherein the terminating step is effected when the number-average molecular weight of the graft polymer is about 700 to about 15,000.

15. The process of claim 14 wherein the number-average molecular weight is about 1,000 to about 10,000.

16. The process of claim 14 wherein the number-average molecular weight is about 1,000 to about 7,000.

17. Graft polymer made according to the continuous process of claim 1.

* * * * *